US012339903B2

(12) United States Patent
Ji et al.

(10) Patent No.: US 12,339,903 B2
(45) Date of Patent: Jun. 24, 2025

(54) VIDEO RETRIEVAL METHOD AND APPARATUS (71) Applicant: Alipay (Hangzhou) Information Technology Co., Ltd., Zhejiang (CN)

(72) Inventors: Kaixiang Ji, Zhejiang (CN); Liguo Feng, Zhejiang (CN); Jian Wang, Zhejiang (CN); Jingdong Chen, Zhejiang (CN); Jiajia Liu, Zhejiang (CN); Siyu Sun, Zhejiang (CN); Weixiang Hong, Zhejiang (CN); Qiqi Hu, Zhejiang (CN); Zhi Qiao, Zhejiang (CN); Xiaoying Zeng, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/324,823

(22) Filed: May 26, 2023

(65) Prior Publication Data
US 2023/0385336 A1     Nov. 30, 2023

(30) Foreign Application Priority Data
May 27, 2022   (CN) .......................... 202210592045.7

(51) Int. Cl.
G06F 16/35     (2025.01)
G06F 16/75     (2019.01)
G06V 10/762    (2022.01)
G06V 10/80     (2022.01)
G06V 20/40     (2022.01)
G06V 20/62     (2022.01)

(52) U.S. Cl.
CPC ............ *G06F 16/75* (2019.01); *G06V 10/762* (2022.01); *G06V 10/806* (2022.01); *G06V 20/46* (2022.01); *G06V 20/63* (2022.01)

(58) Field of Classification Search
None
See application file for complete search history.

(56) References Cited

U.S. PATENT DOCUMENTS

| 2019/0362154 | A1 | 11/2019 | Moore et al. |
| 2020/0057914 | A1 | 2/2020 | Hintz et al. |
| 2020/0257922 | A1* | 8/2020 | Huang ................. G06V 30/224 |

FOREIGN PATENT DOCUMENTS

| CN | 103425757 | A | * | 12/2013 | |
| CN | 110781347 | A | | 2/2020 | |
| CN | 111581437 | A | * | 8/2020 | ........... G06F 16/783 |
| CN | 111626123 | A | | 9/2020 | |

(Continued)

*Primary Examiner* — Augustine K. Obisesan
(74) *Attorney, Agent, or Firm* — Seed IP Law Group LLP (57) ABSTRACT Implementations of the present specification provide a video retrieval method and apparatus. In the method, a video frame in a video to be matched is obtained; an image feature and a text feature are extracted from the video frame; the image feature and the text feature are fused based on a center variable used to represent a cluster center to obtain a fused feature, where the center variable is used to associate features of different modes of a same video; and video retrieval is performed in a video database based on the fused feature to determine a video in the video database that matches the video to be matched, where a plurality of videos and video features corresponding to the plurality of videos are stored in the video database.

20 Claims, 3 Drawing Sheets (56) References Cited

FOREIGN PATENT DOCUMENTS

| | | | | | |
|---|---|---|---|---|---|
| CN | 112381091 | A | * | 2/2021 | |
| CN | 112580599 | A | | 3/2021 | |
| CN | 113297410 | A | | 8/2021 | |
| CN | 114090823 | A | * | 2/2022 | |
| CN | 112905844 | B | * | 3/2022 | ........... G06F 16/683 |
| CN | 114238690 | A | | 3/2022 | |
| CN | 114282049 | A | * | 4/2022 | |
| CN | 114297473 | A | | 4/2022 | |
| CN | 114330475 | A | * | 4/2022 | |
| CN | 114332680 | A | | 4/2022 | |
| CN | 115115913 | A | * | 7/2022 | |
| CN | 115098644 | B | * | 9/2022 | |

* cited by examiner

VIDEO RETRIEVAL METHOD AND APPARATUS

TECHNICAL FIELD

Implementations of the present specification relate to the field of artificial intelligence technologies, and specifically, to a video retrieval method and apparatus.

BACKGROUND

A video includes a plurality of frames of images, and each frame of image can include a plurality of pieces of information such as image information and character information. In many application scenarios, videos need to be stored. For example, in a service promotion task scenario for merchants, merchant scenes need to be photographed in a service promotion process, to restore the task process by using the photographed videos, so that the authenticity of the task can be determined. When a large number of videos are stored, there may be duplicated videos, and therefore, videos in a database need to be retrieved to determine whether there are duplicated videos.

SUMMARY

Implementations of the present specification provide a video retrieval method and apparatus. According to implementations of the present specification, video retrieval can be performed by using features of two different modes, so that the accuracy of video retrieval is improved. In addition, an image feature and a text feature of different modes of the same video are associated by using a center variable, to increase the association between the image feature and the text feature, so that a fused feature can reflect an association feature between the image feature and the text feature, and therefore, video retrieval can be performed based on the image feature, the text feature, and the association feature between the image feature and the text feature that are represented by the fused feature, thereby improving the accuracy of video retrieval.

According to an aspect of implementations of the present specification, a video retrieval, method is provided. The method includes: obtaining a video frame in a video to be matched; extracting an image feature and a text feature from the video frame; fusing the image feature and the text feature based on a center variable used to represent a cluster center to obtain a fused feature, where the center variable is used to associate features of different modes of a same video; and performing video retrieval in a video database based on the fused feature to determine a video in the video database that matches the video to be matched, where a plurality of videos and video features corresponding to the plurality of videos are stored in the video database.

According to an aspect of implementations of the present specification, a video retrieval apparatus is further provided. The apparatus includes: an image acquisition unit, configured to obtain a video frame in a video to be matched; a feature extraction unit, configured to extract an image feature and a text feature from the video frame; a feature fusion unit, configured to fuse the image feature and the text feature based on a center variable used to represent a cluster center to obtain a fused feature, where the center variable is used to associate features of different modes of a same video; and a video retrieval unit, configured to perform video retrieval in a video database based on the fused feature to determine a video in the video database that matches the video to be matched, where a plurality of videos and video features corresponding to the plurality of videos are stored in the video database.

According to an aspect of implementations of the present specification, an electronic device is further provided. The electronic device includes at least one processor, a memory coupled to the at least one processor, and a computer program stored in the memory. The at least one processor executes the computer program to implement any video retrieval method described above.

According to an aspect of implementations of the present specification, a computer-readable storage medium is further provided. The computer-readable storage medium stores a computer program, and when the computer program is executed by a processor, the video retrieval method described above is implemented.

According to an aspect of implementations of the present specification, a computer program product is further provided. The computer program product includes a computer program, and when the computer program is executed by a processor, any video retrieval method described above is implemented.

BRIEF DESCRIPTION OF DRAWINGS

The essence and advantages of implementations of the present specification can be further understood with reference to the following accompanying drawings. In the accompanying drawings, similar components or features can have the same reference numeral.

DESCRIPTION OF IMPLEMENTATIONS

The following discusses the subject matter described herein with reference to example implementations. It should be understood that the discussion of these implementations is merely to enable a person skilled in the art to better understand and thereby achieve the subject matter described herein, and is not intended to limit the protection scope, applicability, or examples set forth in the claims. The function and arrangement of discussed elements can be changed without departing from the protection scope of the content of implementations of the present specification. In the examples, various processes or components can be omitted, replaced, or added as needed. In addition, features described with respect to some examples can alternatively be combined in other examples.

As used herein, the term "include" and a variation thereof are open-ended terms, and mean "including but not limited to". The term "based on" represents "partially based on". The terms "one implementation" and "an implementation" represent "at least one implementation". The term "another implementation" represent "at least one other implementation". The terms "first", "second", and the like can represent different or same objects. Other explicit or implicit definitions can be included below. Unless the context clearly indicates otherwise, the definition of a term is consistent throughout the specification.

A video includes a plurality of frames of images, and each frame of image can include a plurality of pieces of information such as image information and character information. In many application scenarios, videos need to be stored. For example, in a service promotion task scenario for merchants, merchant scenes need to be photographed in a service promotion process, to restore the task process by using the photographed videos, so that the authenticity of the task can be determined. When a large number of videos are stored, there may be duplicated videos, and therefore, videos in a database need to be retrieved to determine whether there are duplicated videos.

A video retrieval method is as follows: a video frame is extracted from a video, videos stored in the database are retrieved by using image information in the video frame, and if image information included in a video in the database matches the extracted image information, it can be considered that the two videos are duplicated videos. For example, if a portal of a merchant in a video to be stored matches a portal of a merchant in one of stored videos, it can be considered that the two videos are videos for the merchant, and therefore, the two videos are duplicated videos.

However, in this method, only one mode (namely, an image feature) is used for video retrieval. The amount of information embodied by one mode is limited, and performing video retrieval by using the limited amount of information leads to low accuracy of a retrieval result.

Some implementations of the present specification provide video retrieval solutions. A video frame in a video to be matched is obtained; an image feature and a text feature are extracted from the video frame; the image feature and the text feature are fused based on a center variable used to represent a cluster center to obtain a fused feature, where the center variable is used to associate features of different modes of a same video; and video retrieval is performed in a video database based on the fused feature to determine a video in the video database that matches the video to be matched, where a plurality of videos and video features corresponding to the plurality of videos are stored in the video database. According to implementations of the present specification, video retrieval can be performed by using features of two different modes, so that the accuracy of video retrieval is improved. In addition, an image feature and a text feature of different modes of the same video are associated by using a center variable, to increase the association between the image feature and the text feature, so that a fused feature can reflect an association feature between the image feature and the text feature, and therefore, video retrieval can be performed based on the image feature, the text feature, and the association feature between the image feature and the text feature that are represented by the fused feature, thereby improving the accuracy of video retrieval.

The video retrieval solutions provided in implementations of the present specification are described in detail herein with reference to the accompanying drawings.

Figure 1:
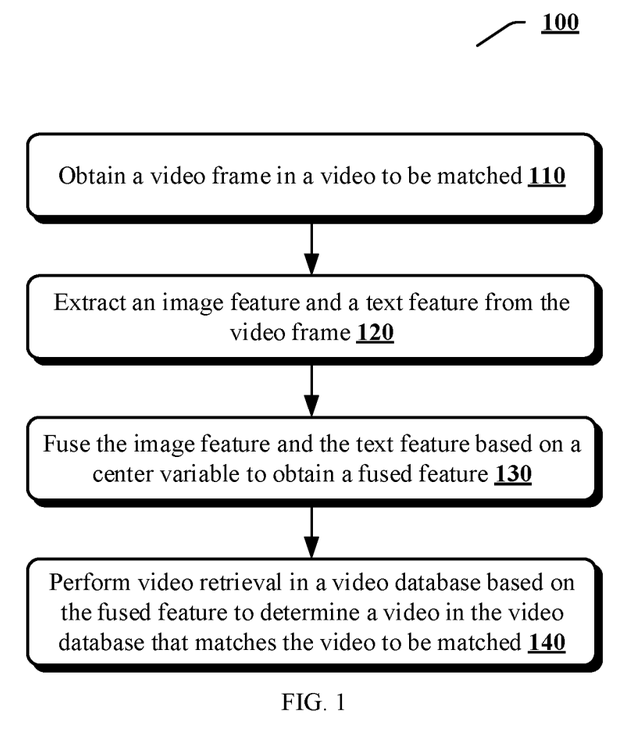
FIG. 1 is a flowchart illustrating an example of a video retrieval method according to an implementation of the present specification.

FIG. 1 is a flowchart illustrating an example process 100 of a video retrieval method according to an implementation of the present specification.

As shown in FIG. 1, in 110, a video frame in a video to be matched can be obtained.

In an implementation of the present specification, the video to be matched is a video used to match a video in a video database. In an example, the video to be matched can be a video to be stored in the video database. Before the video to be matched is stored, videos in the video database can be retrieved based on the video to be matched, to determine whether there is a video in the video database that is the same as or similar to the video to be matched. If no, the video to be matched can be stored in the video database; or if yes, the video to be matched cannot be stored in the video database.

In an example, the video to be matched can be a newly captured video. According to the solutions provided in an implementation of the present specification, it is determined whether the newly captured video to be matched matches a video in the video database. When the newly captured video to be matched matches a video in the video database, it can be determined that the video to be matched is a duplicated video, and the video to be matched can be discarded; or when the newly captured video to be matched does not match a video in the video database, the video to be matched can be stored in the video database.

In an application scenario, for a service promotion task, to restore the task process and prove the authenticity of the task, the task process can be photographed to generate a task scene video. In an example, the video to be matched is a merchant scene video during the service promotion task. When the video to be matched matches a video in the video database, it can be determined that the video to be matched and the matched video are task scene videos for the same merchant.

In an example, a promoted service is a code service, including a payment code, a red envelope code, or the like. A service promoter promotes the code service to merchants, and the service promoter can be commissioned after the code service is successfully promoted. To avoid falsification of service promotion, authentication needs to be performed on the service promotion process by using a video. The generated video is the video to be matched in the present specification. When the generated video matches a video in the video database, it can be determined that the two videos are videos for performing code service promotion for the same merchant, so that it can be further determined that there is a possibility of duplication or falsification of the code service promotion task reflected by the generated video. Therefore, it is unnecessary to perform commissioning for the current code service promotion task.

In an implementation of the present specification, the obtained video frame can be each video frame in the video to be matched, in other words, each video frame in the video to be matched can be processed according to the method of this implementation of the present specification, so that video retrieval can be performed based on each video frame in the video to be matched.

In an example, a plurality of video frames included in the video to be matched can be sampled, and the sampled video frames are used as obtained video frames. In an example, sampling methods can include random sampling, image sampling performed at an interval of a specified number of video frames, and the like. Because the sampling processing is performed, only some video frames in the video to be matched are processed, so that the processing amount for the video to be matched is reduced.

In 120, an image feature and a text feature can be extracted from the video frame.

In an implementation of the present specification, the extracted image feature and text feature belong to the same video frame. In an example, a machine learning model can be trained, so that for an input image, the machine learning model can simultaneously extract an image feature and a text feature in the image. Therefore, the machine learning model can be used to perform image feature extraction and text feature extraction on the video frame. The machine learning model can be a deep learning model.

In an example, two different models can be used to extract an image feature and a text feature respectively. For example, an image encoder can be used to perform image feature extraction on the video frame to obtain the image feature of the video frame, and a text encoder can be used to perform text feature extraction on the video frame to obtain the text feature in the video frame. The image encoder is trained to extract the image feature, and the text encoder is trained to extract the text feature. The image encoder can be a convolution-based image classification network such as ResNet, VGG, or DenseNet, or can be a transformer-based image classification network such as ViT or T2T-ViT. The text encoder can be a transformer-based network such as Bert or RoBERTa, or can be an RNN-based network such as LSTM or Bi-LSTM.

In an example, for text feature extraction, the video frame can be preprocessed to obtain text information in the video frame before text feature extraction is performed on the video frame by using the text encoder, and then text feature extraction is performed on the obtained text information by using the text encoder. In an example of preprocessing, text detection can be performed on the video frame to obtain the text information included in the video frame. The obtained text information can include character information such as Chinese and English presented in the video frame. In an example, text detection methods can include the method of the machine learning model, to be specific, the trained machine learning model can detect and recognize the input image and output the recognized text information.

In an example, the text information is obtained from the video frame before text feature extraction, so that the text encoder only needs to perform text feature extraction on the input text information, thereby improving the efficiency of text feature extraction. Further, for the text encoder, compared with extracting the text feature from the input image, extracting the text feature from the input text information needs a simpler network while the precision of text feature extraction is ensured.

In an example, the video to be matched can be a video for a merchant scene, the merchant scene can include a portal of a merchant, and the portal can include a signboard of the merchant. In an example, text detection can be performed on the signboard included in the video frame to obtain text information in the signboard.

In an example, the signboard is recognized to determine the merchant that the video to be matched is targeted. When a plurality of videos for the same merchant are retrieved during video retrieval, it can be determined that the plurality of videos are duplicated, so that it can be determined that a problem of a plurality of service promotions for the same merchant occurs.

In an example, positioning detection can be performed on the signboard included in the video frame by using a signboard detection module, to obtain a signboard display area. The signboard detection module can be trained to perform positioning detection on the signboard in the image to determine a location of the signboard in the image. Input of the signboard detection module can include the image, and corresponding output can be the display area of the signboard in the input image.

After the signboard display area is obtained, text recognition can be performed on the signboard display area to obtain the text information. In an example, text recognition can be performed on the signboard display area through optical character recognition (OCR). In an example, text recognition can be performed on the signboard display area by using a character recognition model, and the character recognition model is trained to recognize various types of characters such as Chinese and English.

In an example, the signboard in the video frame is positioned to obtain the signboard display area. As such, text recognition only needs to be performed on the signboard display area, and text recognition does not need to be performed on areas other than the signboard display area in the video frame, so that the data amount of text recognition is reduced, and the efficiency of text recognition is improved.

In 130, the image feature and the text feature are fused based on a center variable to obtain a fused feature.

In an implementation of the present specification, there can be a plurality of center variables. For example, there can be eight center variables. Each center variable is used to represent one corresponding cluster center, and cluster centers represented by different center variables are different. Clusters can be obtained through data training, and each cluster has one cluster center. Therefore, the corresponding center variable can be obtained through data training. A cluster center of each cluster can be used to represent a type feature represented by the cluster.

In high-dimensional space, each feature can be represented by one space point, a plurality of space points corresponding to a plurality of features of the same type can constitute one cluster, the center of the cluster can be used as a cluster center, and a spatial location where the cluster center is located is a spatial location represented by a corresponding center variable. In an example, the center variable corresponding to the cluster center can be obtained by averaging space points corresponding to feature points included in the cluster.

The image feature and the text feature are features of different modes. In the high-dimensional space, space points corresponding to features of different modes are far away from each other, and a distance between the space points can represent the association between corresponding features. A larger distance indicates a lower association, and a smaller distance indicates a higher association.

The center variable used to represent the cluster center can be used to associate features of different modes of the same video. In an example, the center variable can be used to associate features of different modes of the same video frame. For example, if the association exists between an image feature and a text feature belonging to the same video frame, the image feature and the text feature of the same video frame can be associated by using the center variable, so that an association feature between the image feature and the text feature of the video frame is obtained.

Figure 2:
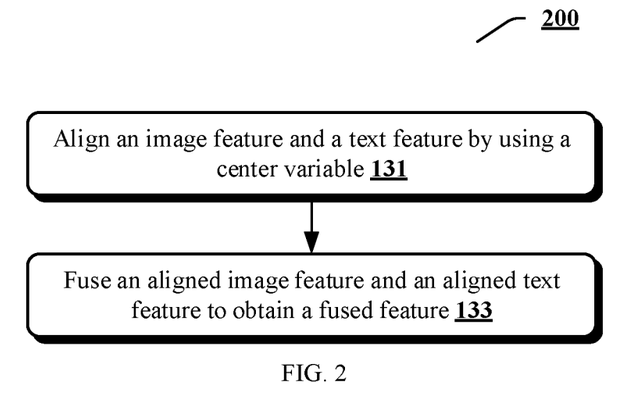
FIG. 2 is a flowchart illustrating an example of feature fusion according to an implementation of the present specification.

FIG. 2 is a flowchart illustrating an example process 200 of feature fusion according to an implementation of the present specification.

As shown in FIG. 2, in 131, an image feature and a text feature can be aligned by using a center variable to obtain an aligned image feature and an aligned text feature.

In an example, the image feature and the text feature can be aligned by using the center variable respectively, to be specific, feature alignment is performed on the image feature and a cluster center represented by the center variable, and feature alignment is performed on the text feature and the cluster center represented by the center variable. As such, both the image feature and the text feature are aligned with the cluster center represented by the center variable, so that the image feature and the text feature are aligned.

Figure 3:
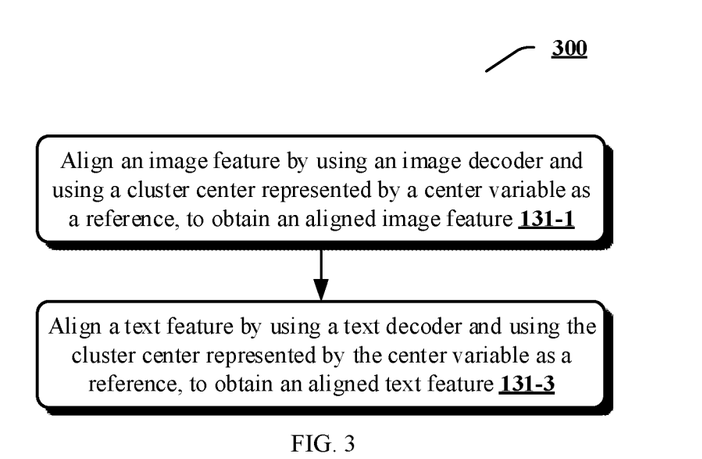
FIG. 3 is a flowchart illustrating an example of alignment of an image feature and a text feature according to an implementation of the present specification.

FIG. 3 is a flowchart illustrating an example 300 of alignment of an image feature and a text feature according to an implementation of the present specification.

As shown in FIG. 3, in 131-1, the image feature can be aligned by using an image decoder and using a cluster center represented by a center variable as a reference, to obtain an aligned image feature.

The image decoder can include an attention mechanism network and a feedforward neural network, and the image decoder can include one or more attention mechanism networks. For example, each image decoder can include two attention mechanism networks, one of which is a mask self-attention mechanism network and the other is a self-attention mechanism network.

In an example, the image feature and the center variable can be input to the image decoder, and the image decoder outputs the image feature aligned with the cluster center represented by the center variable.

In an example, after the image feature and the center variable are input to the image decoder, a first distance at which an image feature vector corresponding to the image feature is mapped to the cluster center represented by the center variable can be calculated in the image decoder. When there are a plurality of center variables, first distances at which the image feature vector is mapped to cluster centers represented by the center variables can be calculated respectively. First distances at which the image feature vector is mapped to different cluster centers can be different.

Then an image feature weight is determined based on each first distance. One image feature weight can be determined correspondingly based on each first distance. For each image feature, first distances of the number that is the same as the number N of center variables can be obtained, so that N image feature weights can be obtained accordingly. When the image feature weights are calculated, the obtained image feature weights can be normalized, so that the sum of obtained image feature weights is equal to 1.

Then the aligned image feature is obtained based on the obtained image feature weight and the image feature. Specifically, the image feature weight can be multiplied by the image feature vector corresponding to the image feature, and the image feature represented by the obtained image feature vector is the aligned image feature.

For example, the feature alignment process of the image feature can be represented by the following equation:

$$Z_C = softmax\left(\frac{(Q_C W_Q)(E W_K)}{\sqrt{d_K}}\right)(E W_V), \quad (1)$$

where $Z_C$ represents the aligned image feature, $Q_C$ represents the center variable input to the image decoder, E represents the image feature input to the image decoder, $W_Q$, $W_K$, and $W_V$ represent parameters in the image decoder, $W_Q$, $W_K$, and $W_V$ are matrices, $\sqrt{d_K}$ represents a constant, and softmax is used for normalizing the image feature vectors.

In 131-3, the text feature can be aligned by using a text decoder and using the cluster center represented by the center variable as a reference, to obtain an aligned text feature.

The text decoder can include an attention mechanism network and a feedforward neural network, and the text decoder can include one or more attention mechanism networks. For example, each text decoder can include two attention mechanism networks, one of which is a mask self-attention mechanism network and the other is a self-attention mechanism network.

In an example, the text feature and the center variable can be input to the text decoder, and the text decoder outputs the text feature aligned with the cluster center represented by the center variable. Parameters can be shared between the text decoder and the image decoder. In an example, the text decoder and the image decoder can be two independent decoders, or can be the same decoder.

In an example, after the text feature and the center variable are input to the text decoder, a second distance at which a text feature vector corresponding to the text feature is mapped to the cluster center represented by the center variable can be calculated in the text decoder. When there are a plurality of center variables, second distances at which the text feature vector is mapped to cluster centers represented by the center variables can be calculated respectively. Second distances at which the text feature vector is mapped to different cluster centers can be different.

Then a text feature weight is determined based on each second distance. One text feature weight can be determined correspondingly based on each second distance. For each text feature, second distances of the number that is the same as the number N of center variables can be obtained, so that N text feature weights can be obtained accordingly. When the text feature weights are calculated, the obtained text feature weights can be normalized, so that the sum of obtained text feature weights is equal to 1.

Then the aligned text feature is obtained based on the obtained text feature weight and the text feature. Specifically, the text feature weight can be multiplied by the text feature vector corresponding to the text feature, and the text feature represented by the obtained text feature vector is the aligned text feature.

For example, the feature alignment process of the text feature can be represented by the equation (1). In this case, in the equation (1), $Z_C$ represents the aligned text feature, $Q_C$ represents the center variable input to the text decoder, E represents the text feature input to the text decoder, $W_Q$, $W_K$, and $W_V$ represent parameters in the text decoder, $W_Q$, $W_K$, and $W_V$ are matrices, $\sqrt{d_K}$ represents a constant, and softmax is used for normalizing the text feature vectors.

It should be noted that an operation sequence of 131-1 and 131-3 can be unlimited. The operation of 131-1 can be performed before the operation of 131-3, as shown in FIG. 3; or the operation of 131-3 can be performed before the operation of 131-1; or the operations of 131-1 and 131-3 can be performed simultaneously.

Returning to FIG. 2, in 133, the aligned image feature and the aligned text feature can be fused to obtain a fused feature.

An association exists between the aligned image feature and the aligned text feature. Therefore, the fused feature obtained after the image feature and the text feature are fused includes not only the image feature and the text feature, but also an association feature between the image feature and the text feature.

Figure 4:
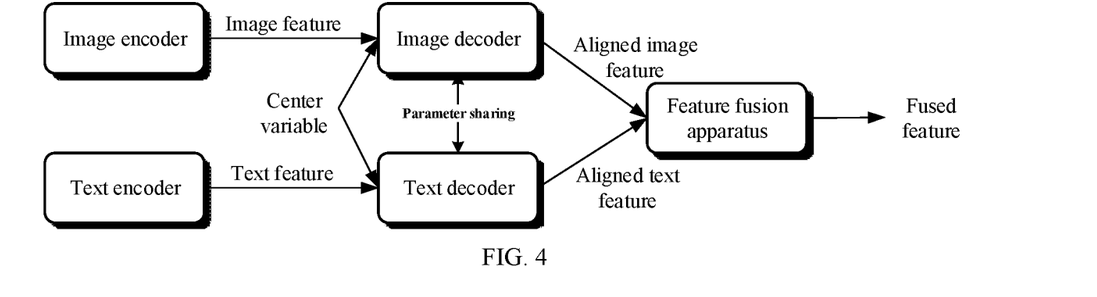
FIG. 4 is a schematic diagram illustrating a process of fusing an image feature and a text feature based on a center variable according to an implementation of the present specification.

FIG. 4 is a schematic diagram illustrating a process of fusing an image feature and a text feature based on a center variable according to an implementation of the present specification. As shown in FIG. 4, an image encoder and a text encoder output an image feature and a text features for a video frame respectively. The image feature and a center variable are input together to an image decoder for feature alignment processing of the image feature, and the image decoder obtains an aligned image feature. The text feature and the center variable are input together to a text decoder for feature alignment processing of the text feature, and the text decoder obtains an aligned text feature. Then the aligned image feature and the aligned text feature are input to a feature fusion apparatus. The feature fusion apparatus is configured to fuse the input features. The feature fusion apparatus outputs the fused feature including the image feature, the text feature, and an association feature between the image feature and the text feature.

Returning to FIG. 1, in 140, video retrieval is performed in the video database based on the fused feature to determine a video in the video database that matches the video to be matched.

In an implementation of the present specification, a plurality of videos and video features corresponding to the plurality of videos are stored in the video database. In an application scenario of merchant scene videos, each merchant scene video is stored in the video database, and different videos are targeted at different merchants. In an example, two videos that match can be considered as videos for the same merchant, and two videos that do not match can be considered as two videos for different merchants.

The fused feature of the video to be matched can be respectively compared with the video features corresponding to the videos in the video database to determine a similarity between the features. When the similarity is relatively high, for example, when the similarity is greater than a similarity threshold, it can be considered that the two compared videos match. When the similarity is relatively low, for example, when the similarity is not greater than the similarity threshold, it can be considered that the two compared videos do not match.

In an implementation of the present specification, a similarity between two features can be represented by the cosine of an angle, a Pearson correlation coefficient, a distance between feature vectors, or the like. The distance between feature vectors can include a Minkowski distance, a Euclidean distance, a Mahalanobis distance, a Hamming distance, a Chebyshev distance, or the like.

In an example, the video to be matched is a merchant scene video during a service promotion task, and the video database stores videos of merchants for which service promotion has been completed. In an example, when the video matching the video to be matched is determined from the video database, it can be determined that a merchant in the video to be matched is a merchant for which service promotion has been completed, and therefore, the video to be matched is not stored in the video database. In an application scenario in which commissioning is performed based on service promotion, it can be determined that falsification or duplication occurs in a service promotion task in the video to be matched, and therefore commissioning is not performed for the current service promotion task.

Figure 5:
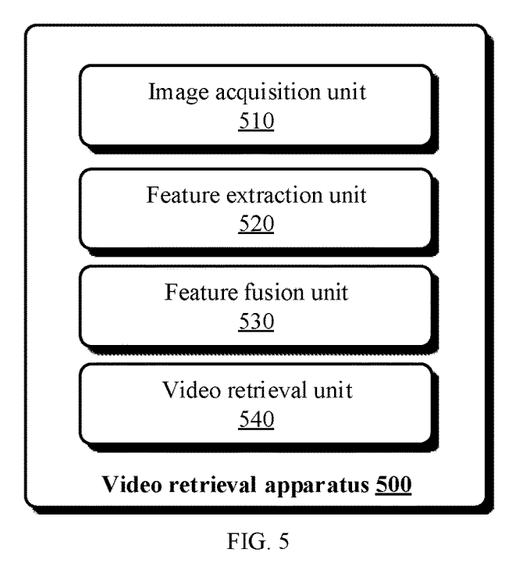
FIG. 5 is a block diagram illustrating an example of a video retrieval apparatus according to an implementation of the present specification.

FIG. 5 is a block diagram illustrating an example of a video retrieval apparatus 500 according to an implementation of the present specification.

As shown in FIG. 5, the video retrieval apparatus 500 includes an image acquisition unit 510, a feature extraction unit 520, a feature fusion unit 530, and a video retrieval unit 540.

The image acquisition unit 510 can be configured to obtain a video frame in a video to be matched.

The feature extraction unit 520 can be configured to extract an image feature and a text feature from the video frame.

In an example, the feature extraction unit 520 includes an image encoder, a text detection module, and a text encoder.

The image encoder can be configured to perform image feature extraction on the video frame to obtain the image feature of the video frame. The text detection module can be configured to perform text detection on the video frame to obtain text information included in the video frame. The text encoder can be configured to perform text feature extraction on the text information to obtain a text feature corresponding to the text information.

In an example, the text detection module can be configured to perform text detection on a signboard included in the video frame to obtain text information in the signboard.

In an example, the text detection module can be configured to perform positioning detection on the signboard included in the video frame by using a signboard detection module, to obtain a signboard display area; and perform text recognition on the signboard display area to obtain text information.

The feature fusion unit 530 is configured to fuse the image feature and the text feature based on a center variable used to represent a cluster center to obtain a fused feature. The center variable is used to associate features of different modes of a same video.

In an example, the feature fusion unit 530 can include a feature alignment module and a feature fusion module.

The feature alignment module can be configured to align the image feature and the text feature by using the center variable to obtain an aligned image feature and an aligned text feature. The feature fusion module can be configured to fuse the aligned image feature and the aligned text feature to obtain the fused feature.

In an example, the feature alignment module includes an image decoder and a text decoder. The image decoder can be configured to align the image feature by using the cluster center represented by the center variable as a reference, to obtain the aligned image feature. The text decoder can be configured to align the text feature by using the cluster center represented by the center variable as a reference, to obtain the aligned text feature. Parameters are shared between the text decoder and the image decoder.

In an example, the image decoder can be further configured to calculate a first distance at which an image feature vector corresponding to the image feature is mapped to the cluster center represented by the center variable; determine an image feature weight based on the first distance; and obtain the aligned image feature based on the image feature weight and the image feature.

In an example, the text decoder can be further configured to calculate a second distance at which a text feature vector corresponding to the text feature is mapped to the cluster center represented by the center variable; determine a text feature weight based on the second distance; and obtain the aligned text feature based on the text feature weight and the text feature.

The video retrieval unit 540 can be configured to perform video retrieval in a video database based on the fused feature to determine a video in the video database that matches the video to be matched. A plurality of videos and video features corresponding to the plurality of videos are stored in the video database.

The implementations of the video retrieval method and apparatus according to implementations of the present specification are described above with reference to FIG. 1 to FIG. 5.

The video retrieval apparatus in implementations of the present specification can be implemented in hardware, or can be implemented in software or a combination of hardware and software. Taking software implementation as an example, a logical apparatus is implemented by reading, by using a processor of a device where the apparatus is located, corresponding computer program instructions in a memory into an internal memory and running the computer program instructions. In implementations of the present specification, the video retrieval apparatus can be implemented by an electronic device, for example.

Figure 6:
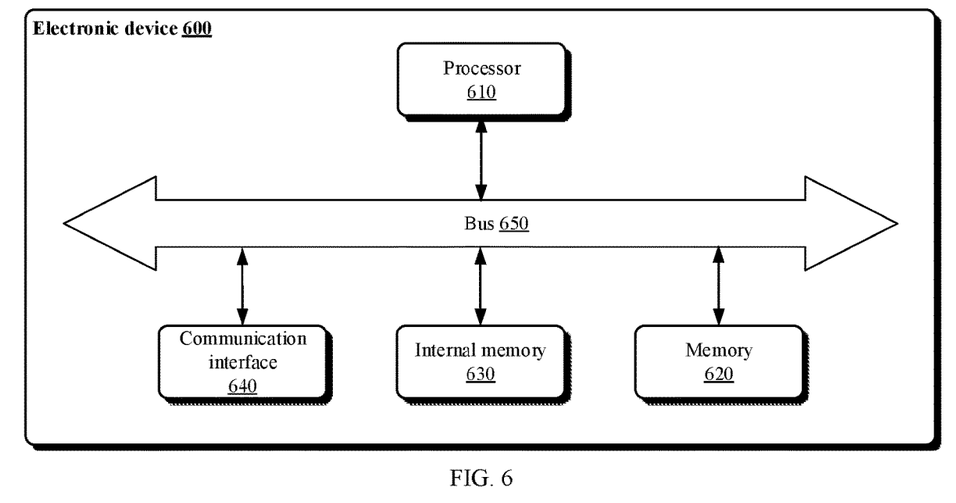
FIG. 6 is a block diagram illustrating an electronic device for implementing a video retrieval method according to an implementation of the present specification.

FIG. 6 is a block diagram illustrating an electronic device 600 for implementing a video retrieval method according to an implementation of the present specification.

As shown in FIG. 6, the electronic device 600 can include at least one processor 610, a memory (for example, a non-volatile memory) 620, an internal memory 630, and a communication interface 640, and the at least one processor 610, the memory 620, the internal memory 630, and the communication interface 640 are connected together through a bus 650. The at least one processor 610 executes at least one computer-readable instruction (for example, the above element implemented in a form of software) stored or encoded in the memory.

In an implementation, computer-executable instructions are stored in the memory, and when the computer-executable instructions are executed, the at least one processor 610 is enabled to obtain a video frame in a video to be matched; extract an image feature and a text feature from the video frame; fuse the image feature and the text feature based on a center variable used to represent a cluster center to obtain a fused feature, where the center variable is used to associate features of different modes of a same video; and perform video retrieval in a video database based on the fused feature to determine a video in the video database that matches the video to be matched, where a plurality of videos and video features corresponding to the plurality of videos are stored in the video database.

It should be understood that when the computer-executable instructions stored in the memory are executed, the at least one processor 610 is enabled to perform the various operations and functions described above with reference to FIG. 1 to FIG. 5 in implementations of the present specification.

According to an implementation, a program product such as a machine-readable medium is provided. The machine-readable medium can have instructions (for example, the elements implemented in a form of software), and when the instructions are executed by a machine, the machine is enabled to perform the various operations and functions described above with reference to FIG. 1 to FIG. 5 in implementations of the present specification.

Specifically, a system or an apparatus provided with a readable storage medium can be provided. Software program code implementing the functions in any one of the above implementations is stored in the readable storage medium, and a computer or a processor of the system or the apparatus is enabled to read and execute instructions stored in the readable storage medium.

In this case, the program code read from the readable medium can implement the functions of any one of the above implementations, and therefore, the machine-readable code and the readable storage medium storing the machine-readable code constitute a part of the present invention.

Computer program code needed for the various operations of the present specification can be written in any one or more programming languages, including object-oriented programming languages such as Java, Scala, Smalltalk, Eiffel, JADE, Emerald, C++, C #, VB, NET, and Python, conventional programming languages such as C, Visual Basic 2003, Perl, COBOL 2002, PHP, and ABAP, dynamic programming languages such as Python, Ruby, and Groovy, or other programming languages. The program code can run on a user computer, or as an independent software package on a user computer, or partially on a user computer and partially on a remote computer, or completely on a remote computer or server. In the latter case, the remote computer can be connected to a user computer in any network form, for example, a local area network (LAN) or a wide area network (WAN), or connected to an external computer (for example, through the Internet), or in a cloud computing environment, or used as a service, for example, a software as a service (SaaS).

Examples of the readable storage medium include a floppy disk, a hard disk, a magneto-optical disk, an optical disk (for example, a CD-ROM, CD-R, CD-RW, a DVD-ROM, a DVD-RAM, or DVD-RW), a magnetic tape, a non-volatile memory card, and a ROM. In some implementations, the program code can be downloaded from a server computer or from the cloud by using a communication network.

Specific implementations of the present specification are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily need a particular execution order to achieve the desired results. In some implementations, multi-tasking and concurrent processing is feasible or can be advantageous.

Not all the steps and units in the above processes and system structural diagrams are mandatory, and some steps or units can be ignored as actually needed. An execution sequence of the steps is not fixed, and can be determined as needed. The apparatus structures described in the above implementations can be physical structures or logical structures. For example, some units can be implemented by the same physical entity, or some units can be respectively implemented by a plurality of physical entities, or can be jointly implemented by some components in a plurality of independent devices.

The term "for example" used throughout the present specification means "being used as an example, an instance, or an illustration", and does not mean "being more preferred" or "being more advantageous" than other implementations. Specific implementations include specific details for the purpose of providing an understanding of the described technologies. However, these technologies can be practiced without these details. In some instances, well-known structures and apparatuses are shown in a form of block diagrams to avoid obscuring the concepts of the described implementations.

Example implementations of the present specification are described in detail above with reference to the accompanying drawings. However, implementations of the present specification are not limited to specific details of the above implementations. Various simple variations of the technical solutions of implementations of the present specification can be made within the scope of the technical concept of implementations of the present specification, and fall within the protection scope of implementations of the present specification.

The above descriptions of the content of the present specification are provided to enable any person of ordinary skill in the art to implement or use the content of the present specification. Various modifications to the content of the present specification are apparent to a person of ordinary skill in the art, and the general principles described herein can be applied to other variations without departing from the protection scope of the content of the present specification. The embodiments or implementation described herein can be combined, modified, or rearranged to generate further embodiments or implementations, which are all included in the scope of the disclosure. Therefore, the content of the present specification is not limited to the examples and designs described herein, but is consistent with the widest scope in accordance with the principles and novel features disclosed herein.

What is claimed is:

1. A method, comprising:
   obtaining a video frame in a video to be matched;
   automatically extracting, by a machine learning model, an image feature and a text feature from the video frame;
   automatically fusing, by a machine learning model, the image feature and the text feature based on a same center variable that represents a cluster center to obtain a fused feature, the center variable configured to associate features of different modes of a same video; and
   performing video retrieval in a video database based on the fused feature to determine a video in the video database that matches the video to be matched,
   wherein the fusing the image feature and the text feature includes, for each one of the image feature or the text feature:
      determining a distance between the one of the image feature or the text feature to the same center variable;
      determining a weight of the one of the image feature or the text feature based on the distance;
      generating an aligned feature of the one of the image feature or the text feature based on the one of the image feature or the text feature and the weight; and
      generating the fused feature using the aligned feature.

2. The method according to claim 1, wherein the fusing the image feature and the text feature based on the center variable used to represent the cluster center to obtain the fused feature includes:
   aligning the image feature and the text feature by using the center variable to obtain an aligned image feature and an aligned text feature; and
   fusing the aligned image feature and the aligned text feature to obtain the fused feature.

3. The method according to claim 2, wherein the aligning the image feature and the text feature by using the center variable to obtain the aligned image feature and the aligned text feature includes:
   aligning the image feature by using an image decoder and using the cluster center represented by the center variable as a reference, to obtain the aligned image feature; and
   aligning the text feature by using a text decoder and using the cluster center as a reference to obtain the aligned text feature, wherein the text decoder and the image decoder share one or more parameters.

4. The method according to claim 3, wherein the aligning the image features by using the image decoder and using the cluster center as a reference includes:
   calculating, by using the image decoder, a first distance at which an image feature vector corresponding to the image feature is mapped to the cluster center;
   determining an image feature weight based on the first distance; and
   obtaining the aligned image feature based on the image feature weight and the image feature.

5. The method according to claim 3, wherein the aligning the text feature by using the text decoder and using the cluster center as a reference includes:
   calculating, by using the text decoder, a second distance at which a text feature vector corresponding to the text feature is mapped to the cluster center;
   determining a text feature weight based on the second distance; and
   obtaining the aligned text feature based on the text feature weight and the text feature.

6. The method according to claim 1, wherein the extracting the image feature and the text feature from the video frame includes:
   performing image feature extraction on the video frame by using an image encoder, to obtain the image feature of the video frame;
   performing text detection on the video frame to obtain text information included in the video frame; and
   performing text feature extraction on the text information by using a text encoder, to obtain a text feature corresponding to the text information.

7. The method according to claim 6, wherein the performing text detection on the video frame to obtain the text information included in the video frame includes:
   performing text detection on a signboard included in the video frame to obtain text information in the signboard.

8. The method according to claim 7, wherein the performing text detection on the signboard included in the video frame to obtain the text information in the signboard includes:
   performing positioning detection on the signboard included in the video frame to obtain a signboard display area; and
   performing text recognition on the signboard display area to obtain the text information.

9. A computing system comprising one or more processors and one or more memory devices, the one or more memory devices having computer executable instructions stored thereon, which when executed by the one or more processors enable the one or more processors to perform acts including:
   obtaining a video frame in a video to be matched;
   automatically extracting, by a machine learning model, an image feature and a text feature from the video frame;
   automatically fusing, by a machine learning model, the image feature and the text feature based on a same center variable that represents a cluster center to obtain a fused feature, the center variable configured to associate features of different modes of a same video; and
   performing video retrieval in a video database based on the fused feature to determine a video in the video database that matches the video to be matched, wherein the fusing the image feature and the text feature includes, for each one of the image feature or the text feature:
  determining a distance between the one of the image feature or the text feature to the same center variable;
  determining a weight of the one of the image feature or the text feature based on the distance;
  generating an aligned feature of the one of the image feature or the text feature based on the one of the image feature or the text feature and the weight; and
  generating the fused feature using the aligned feature.

10. The computing system according to claim 9, wherein the fusing the image feature and the text feature based on the center variable used to represent the cluster center to obtain the fused feature includes:
  aligning the image feature and the text feature by using the center variable to obtain an aligned image feature and an aligned text feature; and
  fusing the aligned image feature and the aligned text feature to obtain the fused feature.

11. The computing system according to claim 10, wherein the aligning the image feature and the text feature by using the center variable to obtain the aligned image feature and the aligned text feature includes:
  aligning the image feature by using an image decoder and using the cluster center represented by the center variable as a reference, to obtain the aligned image feature; and
  aligning the text feature by using a text decoder and using the cluster center as a reference to obtain the aligned text feature, wherein the text decoder and the image decoder share one or more parameters.

12. The computing system according to claim 11, wherein the aligning the image features by using the image decoder and using the cluster center as a reference includes:
  calculating, by using the image decoder, a first distance at which an image feature vector corresponding to the image feature is mapped to the cluster center;
  determining an image feature weight based on the first distance; and
  obtaining the aligned image feature based on the image feature weight and the image feature.

13. The computing system according to claim 11, wherein the aligning the text feature by using the text decoder and using the cluster center as a reference includes:
  calculating, by using the text decoder, a second distance at which a text feature vector corresponding to the text feature is mapped to the cluster center;
  determining a text feature weight based on the second distance; and
  obtaining the aligned text feature based on the text feature weight and the text feature.

14. The computing system according to claim 9, wherein the extracting the image feature and the text feature from the video frame includes:
  performing image feature extraction on the video frame by using an image encoder, to obtain the image feature of the video frame;
  performing text detection on the video frame to obtain text information included in the video frame; and
  performing text feature extraction on the text information by using a text encoder, to obtain a text feature corresponding to the text information.

15. The computing system according to claim 14, wherein the performing text detection on the video frame to obtain the text information included in the video frame includes:
  performing text detection on a signboard included in the video frame to obtain text information in the signboard.

16. The computing system according to claim 15, wherein the performing text detection on the signboard included in the video frame to obtain the text information in the signboard includes:
  performing positioning detection on the signboard included in the video frame to obtain a signboard display area; and
  performing text recognition on the signboard display area to obtain the text information.

17. A non-transitory storage medium having computer executable instructions stored thereon, the computer executable instructions, when executed by the one or more processors, configure the one or more processors to perform actions comprising:
  obtaining a video frame in a video to be matched;
  automatically extracting, by a machine learning model, an image feature and a text feature from the video frame;
  automatically fusing, by a machine learning model, the image feature image feature and the text feature based on a same center variable that represents a cluster center to obtain a fused feature, the center variable configured to associate features of different modes of a same video; and
  performing video retrieval in a video database based on the fused feature to determine a video in the video database that matches the video to be matched,
  wherein the fusing the image feature and the text feature includes, for each one of the image feature or the text feature:
    determining a distance between the one of the image feature or the text feature to the same center variable;
    determining a weight of the one of the image feature or the text feature based on the distance;
    generating an aligned feature of the one of the image feature or the text feature based on the one of the image feature or the text feature and the weight; and
    generating the fused feature using the aligned feature.

18. The non-transitory storage medium according to claim 17, wherein the fusing the image feature and the text feature based on the center variable used to represent the cluster center to obtain the fused feature includes:
  aligning the image feature and the text feature by using the center variable to obtain an aligned image feature and an aligned text feature; and
  fusing the aligned image feature and the aligned text feature to obtain the fused feature.

19. The non-transitory storage medium according to claim 18, wherein the aligning the image feature and the text feature by using the center variable to obtain the aligned image feature and the aligned text feature includes:
  aligning the image feature by using an image decoder and using the cluster center represented by the center variable as a reference, to obtain the aligned image feature; and
  aligning the text feature by using a text decoder and using the cluster center as a reference to obtain the aligned text feature, wherein the text decoder and the image decoder share one or more parameters.

20. The non-transitory storage medium according to claim 19, wherein the aligning the image features by using the image decoder and using the cluster center as a reference includes:
  calculating, by using the image decoder, a first distance at which an image feature vector corresponding to the image feature is mapped to the cluster center;

determining an image feature weight based on the first distance; and obtaining the aligned image feature based on the image feature weight and the image feature.

\* \* \* \* \*

UNITED STATES PATENT AND TRADEMARK OFFICE
CERTIFICATE OF CORRECTION

| | | |
|---|---|---|
| PATENT NO. | : 12,339,903 B2 | Page 1 of 1 |
| APPLICATION NO. | : 18/324823 | |
| DATED | : June 24, 2025 | |
| INVENTOR(S) | : Kaixiang Ji et al. | |

It is certified that error appears in the above-identified patent and that said Letters Patent is hereby corrected as shown below:

In the Claims

<u>Column 16, Claim 17, Line 21</u>:
"image feature image feature and the text feature"
Should read:
--image feature and the text feature--.

Signed and Sealed this
Eleventh Day of November, 2025

John A. Squires
*Director of the United States Patent and Trademark Office*